March 13, 1962   J. H. HARKER   3,025,069
SEAT FOR ROTARY MECHANICAL SEALS
Filed Jan. 14, 1957   2 Sheets-Sheet 1

Inventor
John H. Harker
By Mann, Brown and McWilliams
Attys

March 13, 1962 J. H. HARKER 3,025,069
SEAT FOR ROTARY MECHANICAL SEALS
Filed Jan. 14, 1957 2 Sheets-Sheet 2
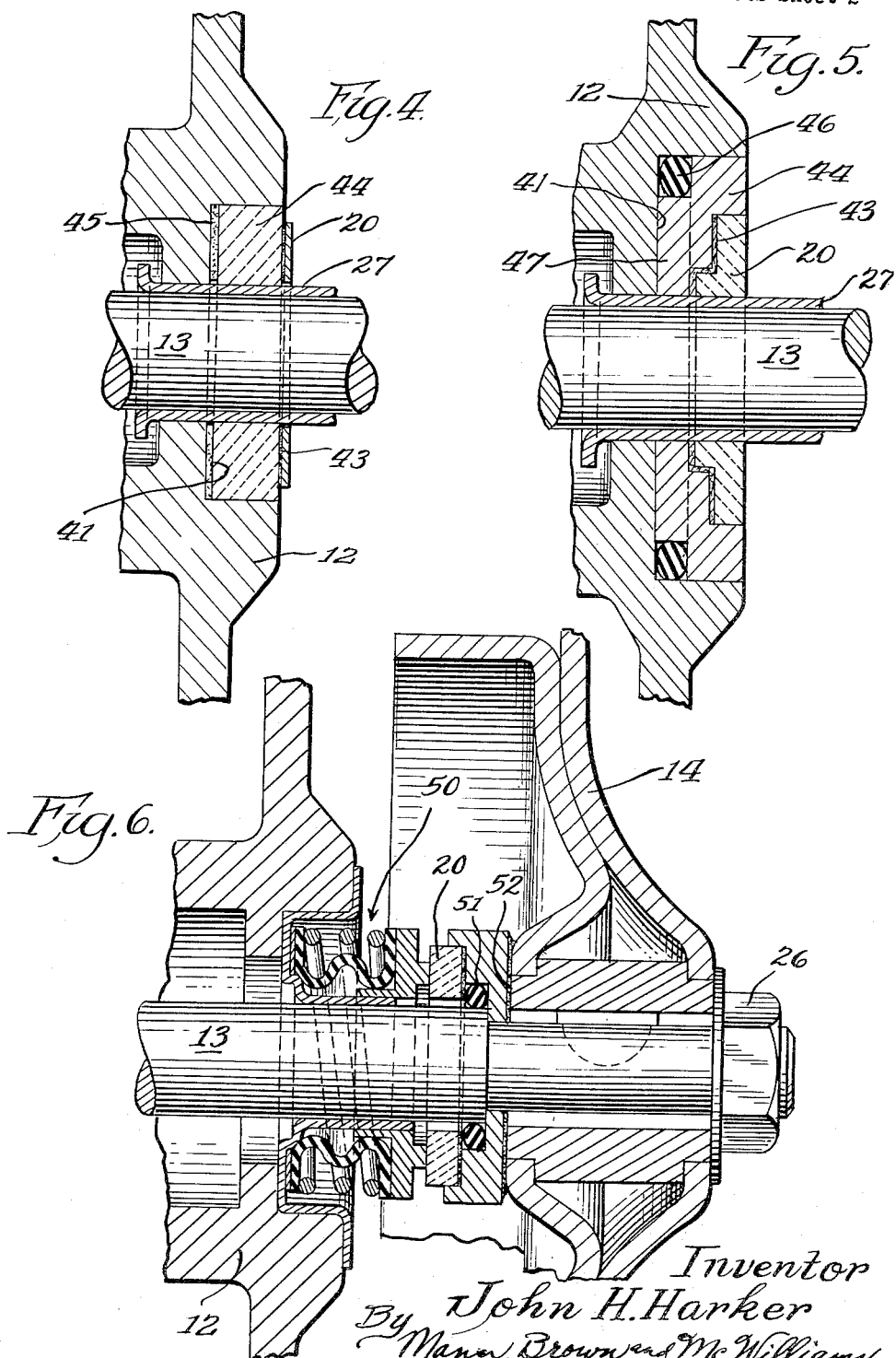

United States Patent Office 3,025,069
Patented Mar. 13, 1962

3,025,069
SEAT FOR ROTARY MECHANICAL SEALS
John H. Harker, Park Ridge, Ill., assignor to Bell & Gossett Company, a corporation of Illinois
Filed Jan. 14, 1957, Ser. No. 633,878
6 Claims. (Cl. 277—22)

This invention relates to pump seals and more particularly it is concerned with an improved construction and method for forming a seal between a rotating pump shaft and the pump casing wall through which the shaft projects.

In a typical application to which the invention is applicable, the pump seal consists of a pair of mating sealing rings that are telescoped over the rotatable pump shaft with one ring sealed against the pump wall and the other ring sealed against the shaft. In recent practice, the yielding ring of the mating pair of sealing rings has been made of carbon or similar material while the non-yielding ring has been made of an extremely hard seal face material such as a high alumina body ceramic which is notably fragile and brittle. It has been common practice, therefore, to mount the fragile ceramic ring in a suitable cavity with a cushioned backing such as rubber between the adjacent parallel walls of the cavity and the ring to provide the desired seal. In addition, there may or may not be a stationary metallic locking ring in the annular space between the cavity and the ceramic ring having cooperating tongue and groove engagement with the ceramic ring and the cavity to fix the ceramic ring against movement relative to the cavity.

Experience with this construction in the pump industry has witnessed an unusual number of pump shutdowns due to seal failures traced to breakage of the ceramic ring. While the cost of replacing the ring itself is minor, the unexpected shutdowns in pumping operations are a problem of major significance but, until the present invention, no satisfactory solution to this seal failure problem has been forthcoming.

The principal object of the present invention is to provide a reliable and long lived pump seal that avoids the above noted difficulties of the prior art arrangement and that is capable of substantially universal application.

Other objects and advantages of the invention will become apparent during the course of the following description.

In the accompanying drawings, forming a part of this specification, and in which like numerals are employed to designate like parts throughout the same:

FIGS. 4 and 5 are cross-sectional views similar to FIG. 2 but showing alternative embodiments of the pump seal construction; and FIG. 6 is a fragmentary cross-sectional view illustrating still another alternative embodiment of the pump seal of the invention.

Figure 1:
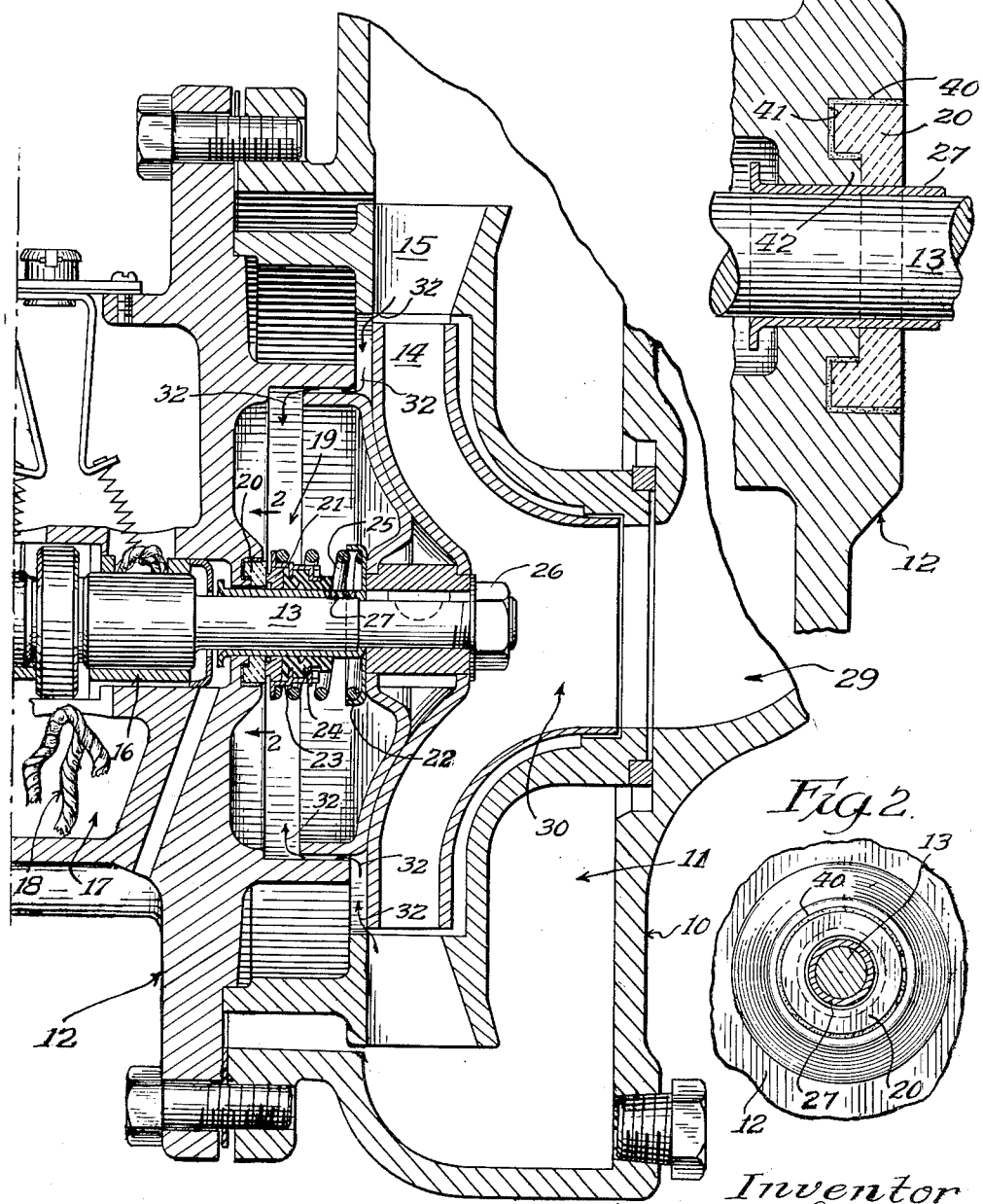
FIG. 1 is a fragmentary cross-sectional view through the pumping chamber of a typical pump to which the invention is applicable, illustrating the general construction and arrangement of the pump seal.
Figure 2:
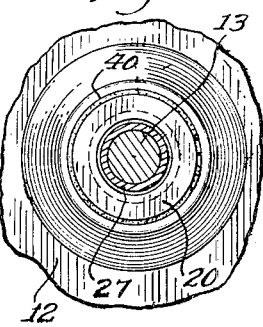
FIG. 2 is a transverse view taken on the line 2—2 of FIG. 1.

Referring to the drawings and particularly to FIGS. 1 and 2, there is shown a typical pump on which the seal of the invention is employed. Generally the pump comprises a casing 10, forming a pumping chamber 11, and having a chamber closing wall 12 through which projects a rotatable pump shaft 13 with the inner end of the shaft carrying an impeller 14 that cooperates with a diffuser element 15 to develop the pumping action. This pump arrangement is well known and is characterized by the fact that it is self priming.

As shown, the shaft 13 is rotatably supported on a bearing 16 carried by the chamber closing wall 12 and the bearing is supplied with oil stored in a lubricant chamber 17 through a suitable wicking arrangement 18.

It is, of course, necessary to provide a seal between the chamber closing wall 12 and the shaft 13 in order to prevent leakage in to or out of the pumping chamber 11 through the closing wall due to pressure differentials existing on opposite sides of this wall during operation of the pump. Such a seal, as designated generally at 19, includes a stationary ceramic ring 20 telescoped over the shaft 13 and seated on the chamber closing wall in sealing engagement therewith and a cooperating rotatable ring assembly including a carbon ring 21 that is telescoped over the shaft 13 for sealing relationship therewith. The rotatable ring assembly is of a conventional type such as furnished by the Crane Packing Co. of Morton Grove, Illinois, and includes a spring seat 22 that abuts against the impeller 14 which is held in place on the shaft by a suitable nut 26, a spring follower 23 carried on a bellows 24 of flexible extensible material such as rubber, and a coil spring 25 that reacts between the shaft 13 and the carbon ring 21 to urge the ring into sealing engagement with the ceramic ring 20. The bellows 24 forms a seal between the carbon ring 21 and a tubular metallic shaft liner 27 which in turn is sealed directly to the shaft.

In operation the shaft 13, impeller 14, and carbon ring assembly are rotated within the pumping chamber by a suitable driving motor (not shown) to draw the material being pumped through the pump inlet 29 and through the eye 30 of the impeller, and to move this material by centrifugal force into the outer regions of the pumping chamber. During normal operation the pumping chamber is filled with the material being pumped and depending upon the application, significant pressures are developed. Due to the pressures existing within the pumping chamber, the material being pumped is forced along the paths indicated by the arrows 32 to surround the pump seal and subject it to the pressures in the pumping chamber. This pressure acts upon the sealing surfaces for the mountings of the rings 20 and 21 and between the rings themselves.

It should require no detailed explanation to point up the fact that the fragile ceramic ring is frequently subjected to mechanical shocks and, to provide for this, it has been customary in the prior art to form a cushioned mounting for the ring. Of necessity, the rubber gasket which has served as the cushion for the ring has been of substantial thickness and therefore has acted as an insulator in that it prevents heat generated at the sealing surfaces of the mating rings from being conducted away via the metallic parts of the pump. There is thus a tendency for heat to be concentrated on the ceramic ring and this condition presents an opportunity for thermal shocks, such as are associated with a rapid change in the temperature of the material being pumped, to set up harmful stresses in the ceramic ring.

The problem of thermal shock is aggravated where the seal is used with a self-priming pump, such as is shown in FIG. 1, because during the priming cycle of the initial period of operation the pump is operating substantially dry. During this substantially dry priming operation, considerable heat is developed between the sealing rings but little, if any, of this heat is conducted away from the sealing rings and there is a resultant temperature rise at the rings. Therefore when the priming cycle is completed and the liquid being pumped surrounds the sealing rings, the sharp difference in temperature between the ceramic ring and the surrounding liquid applies a serious thermal shock to the ceramic ring. Actually such thermal shocks are believed to be non-uniform, in that different parts of the ceramic ring are differently stressed, and this accentuates the harmful internal stresses to which the ceramic ring is subjected.

It is thought, however, that thermal shock is not the total explanation for the frequent breakage of the ceramic ring in the case of the prior art construction, but that it acts in combination with mechanical shocks that are developed due to the fact that the cushioned ring yields locally when subjected to unequal loading during the operation of the pump.

The present invention is aimed at eliminating this peculiar and indefinable combination of mechanical and thermal shocks and has devised a unique and highly simplified solution for minimizing such shocks. Generally speaking, this is accomplished by mounting the fragile ceramic ring in effective thermal contact with a relatively massive body so that the body acts as a thermal sink and continuously draws off the heat generated between the sealing surfaces of the rings. In effect, this stabilizes the ring temperature and for all practical purposes eliminates damaging thermal shocks. Simultaneously with the provision of the thermal sink, however, the invention provides a rigid mechanical backing that holds the ring inflexibly and thereby precludes the possibility of damaging internal stresses arising from bending of the ring due to the unbalanced loads to which it is subjected. This approach to the problems of mechanical shock is unique in that it contradicts the usual principles which call for a cushioned mounting for fragile materials, but it is believed that, in the case of shaft sealing arrangements of the general type described herein, the use of a cushion for the ceramic ring results in the ring being subjected to bending stresses. Such stresses place one portion of the ring in compression and another in tension and the ceramic material is not capable of withstanding tensile stresses in any significant amount.

The general method of solution of the problem of seal failure due to breakage of the ceramic ring has been outlined above but it may be embodied in a variety of ways, each of which offer their own specific advantages.

In the practical application of the teachings of the invention attention must be given to factors affecting the commercial situation such as the cost of manufacture and the universality of the application of the pump as it is affected by the types of materials that can be handled by the pump and by the specific operating problems encountered in certain applications. In providing a pump of universal applicability, it is necessary to consider the possibility that many applications require that corrosive materials be handled by the pump and it is important that the parts of the pump be unaffected when subjected to such materials, and all of the following specific applications of the method of the invention bear in mind these diverse considerations.

Figure 3:
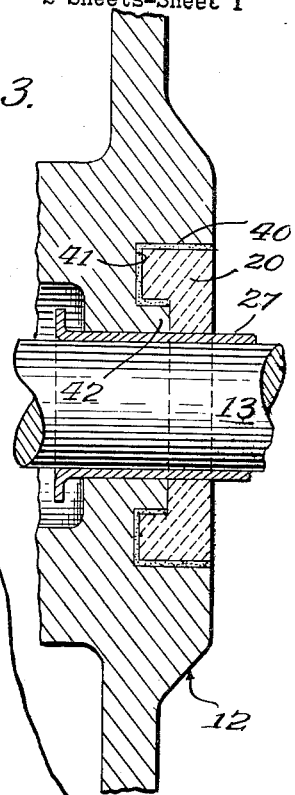
FIG. 3 is an enlarged sectional view of a portion of the pump seal arrangement of FIGS. 1 and 2.

As has been pointed out above, the critical problem solved by this invention relates to the specific manner of mounting the fragile ceramic ring, and for convenience the arrangement of FIG. 1 is reproduced in the enlarged sectional view of FIG. 3 wherein the ceramic ring 20 is shown bonded to the closing wall 12 of the pump casing. For this purpose it is preferred to employ a thermo-setting epoxy resin base adhesive as indicated at 40 which is dabbed into the seat forming cavity 41 that is provided in the chamber closing wall 12. This adhesive is film forming and is capable of developing an adequate bonding action even when the thickness of its film is on the order of .0015 to .003 inch. In practice, of course, the actual clearance between the surfaces of the seat and the sealing ring is determined by the manufacturing tolerances but it is important that the adhesive be capable of forming an adequate bond over the entire range of clearances that will be encountered. It should be noted that the seat 41 is preferably in the form of a well in that the chamber closing wall includes an inner annular lip 42.

The well serves to confine the adhesive that is applied to the seat and thus insures that an adequate supply of adhesive will be present for securing the ceramic ring 20 to the chamber closing wall. In practice, of course, the pump is turned on end prior to the application of the adhesive.

With this arrangement, a continuous layer of bonding material surrounds the pump shaft 13 and, in addition to securely holding the ring 20, the adhesive forms a fluid tight seal between the chamber closing wall and the ceramic ring. While the epoxy resin base adhesive is preferred for its property of high heat resistance, strong adhesive action and good corrosion resistance in the presence of most materials, it is recognized that other adhesives such as polyester resin adhesives and phenol base adhesives might also be employed in certain instances. Regardless of which specific type of adhesive is used, one of the advantages of the invention resides in the use of an adhesive that is capable of forming an effective bond when it is of a thickness of only .0015 inch. The benefit of the use of such a thin film resides in the fact that, even if the material being pumped were corrosive and able to consume the adhesive, the time required for the complete destruction of the seal would be considerably lengthened because the thinness of the film presents such a small area of contact between the adhesive and the corrosive material. It would be necessary for the corrosive material to eat all the way through the outline of the adhesive layer as it appears on FIG. 3 before the seal would fail.

The thinness of the film of adhesive also permits the broader purposes of the invention to be realized in that the film rigidly interconnects the ceramic ring 20 and the chamber closing wall to the end that the wall acts as a rigid mechanical backing for the ring and to the end that the film provides an effective thermal connection between the wall and the ring such that the wall may act as a thermal sink and drain off heat generated at the ring. Irrespective of the correctness of the details of the theoretical analysis set forth hereinabove which have led to the construction of FIG. 3, it is a fact that this construction has eliminated breakage of the ceramic ring and hence represents a valuable and important advance in the pump sealing art.

While the adhesive mounting arrangement of FIG. 3 has thus far appeared most practical from a commercial standpoint, numerous alternative embodiments for mounting the ceramic ring are contemplated. For example, in FIG. 4 the chamber closing wall 12 is formed with a conventional right-angular recess forming an annular seat 41 and the ceramic ring 20 consists of a relatively thin annulus that is bonded by an impermeable layer of adhesive 43 to a metallic reinforcing element 44 which in turn is rigidly secured to the closing wall by a continuous layer of solder or weld material 45 which surrounds the shaft 13 and forms an effective seal between the reinforcing element and the chamber closing wall 12. In this instance, the reinforcing element 44 adequately supports the ceramic ring 20 against bending due to unbalanced mechanical loading but is not, in and of itself, sufficient to constitute a thermal sink for the ceramic ring. This function is again performed by the chamber closing wall 12 but is dependent upon the ability of the reinforcing element 44 to complete an effective thermal connection between the ring 20 and the wall 12. The connection is established not only through the bonding material itself but also by the contacting circumferential surfaces of the wall 12 and the reinforcing element 44.

It is also proposed to embody the invention in the form of a replaceable cartridge type mount for the ceramic ring to facilitate replacement and repair in the field. Actually the concepts of the present invention lend themselves to a cartridge type construction, as will become apparent from a consideration of the alternative arrangements of FIGS. 5 and 6. In the arrangement of FIG. 5 the cartridge is applied to the chamber closing wall 12 and for this purpose the ceramic ring 20 is secured to a metallic reinforcing element 44 by a continuous impermeable layer of adhesive 43 and the reinforcing element in turn is held within an enlarged annular cavity 41 formed in the chamber closing wall 12 by means of a rubber O-ring 46 of familiar construction. The reinforcing element is stepped at its rear end 47 to provide the annular mounting recess for the O-ring. It will be noted in the case of FIG. 5 that the reinforcing element is considerably larger in diameter than in the arrangement of FIG. 4 and this is important because it is desirable to maximize the frictional effect of the O-ring since its holding action is inherently weaker than the holding action in the case of the bonding arrangements.

In certain applications there is a possibility that the carbon ring will stick to the ceramic ring 20 and it is important that the mounting for the ceramic ring be stronger than the sticking tendency between the sealing rings. This creates a problem in the case of a removable cartridge type construction such as is shown in FIG. 5 and it is best solved by increasing the size of the O-ring 46.

As was the case in the FIG. 4 arrangement, the reinforcing element directly provides the rigid mechanical backing for the FIG. 5 arrangement and here again the larger size O-ring enhances this action. Through its surface contact with the closing wall 12, the reinforcing element provides the thermal connection between the closing wall and the ceramic ring and thereby permits the closing wall to act as a thermal sink that stabilizes the temperature of the ceramic ring.

FIG. 6 illustrates a cartridge arrangement that is substantially the reverse of the arrangement of FIG. 5 in that the carbon ring assembly generally designated as 50 is mounted on and forms a seal with the stationary chamber closing wall 12 while the ceramic ring 20 is mounted on and rotates with the pump shaft 13. In this case the ceramic ring is secured to a reinforcing element 44 by a continuous impermeable layer of adhesive and the reinforcing element in turn is rigidly mounted on the shaft by means of a rubber O-ring 51 and/or by means of a continuous layer of weld material 52. Since the diameter of the O-ring is considerably smaller than in the case of FIG. 5, it is desirable to also provide the welded layer. In the case of FIG. 6 the thermal sink for the ceramic ring is provided by the pump shaft which is in effective thermal contact with the ring through the medium of the reinforcing element. The reinforcing element itself, however, provides the desired mechanical rigidity.

In all of the disclosed embodiments, a continuous layer of bonding material, whether it be an adhesive or solder or weld material, is employed in securing the ceramic ring to its supporting member. In each case this layer of bonding material is capable of providing the desired thermal connection between the ceramic ring and its supporting member and the arrangements are such that in each case a solid mechanical backing is provided for the ceramic ring whether the backing be in the form of the chamber closing wall itself or in the form of an intermediate reinforcing element. It is recognized that the actual bonding material employed may be varied considerably from those specifically disclosed herein, however, it is contemplated that any material capable of forming the desired thermal connection and the necessary sealing action may be employed without departing from the scope of the invention.

I claim:

1. A seat for a mechanical seal for a rotating shaft and comprising a seal ring made of a ceramic material that is frangible under given conditions of thermal shock and mechanical stress, a massive metallic body capable of providing a thermal sink for dissipation of heat from said seal ring, and securing means for connecting the ring to the body to provide the ring with rigid mechanical backing and with an operatively connected thermal sink to protect said ring against mechanical and thermal shocks, said securing means including a continuous impermeable bonding and sealing layer on said ring and encircling the axis thereof for connecting said ring in sealed relation to said body.

2. A seat arrangement according to claim 1 wherein said body includes an annular recess encircling the axis of said ring to form a well in which said sealing layer and said ring are situated.

3. A seat arrangement according to claim 1 in which said bonding and sealing layer is a film-forming adhesive.

4. The seat of claim 1 wherein said securing means includes a mechanically rigid thermally conductive annular mounting element to which said ring is bonded by said sealing layer to form a replaceable cartridge and means for securing said cartridge to said body in thermally conductive sealed relationship.

5. The seat of claim 4 wherein said mounting element includes an annular recess adjacent to and encircling the axis of said ring to form a well in which said sealing layer and said ring are situated.

6. The seat of claim 4 wherein said body includes an annular cavity encircling the axis of said ring and shaped to receive the mounting element, wherein said mounting element has an exterior peripheral seat on a diameter significantly greater than the diameter of said seal ring, and wherein an O-ring sealing and friction element is disposed in the last-named seat to secure said element in said cavity in thermally conductive relation with said body.

References Cited in the file of this patent

UNITED STATES PATENTS

| | | |
|---|---|---|
| 1,820,100 | Thompson | Aug. 25, 1931 |
| 2,425,209 | Snyder et al. | Aug. 5, 1947 |
| 2,463,695 | Jensen | Mar. 8, 1949 |
| 2,785,913 | Solari | Mar. 19, 1957 |